United States Patent [19]
Rigato

[11] Patent Number: 5,908,199
[45] Date of Patent: Jun. 1, 1999

[54] ARM PROPULSION SYSTEM FOR BICYCLES AND THE LIKE, THAT MAY BE COMBINED WITH CONVENTIONAL FOOT PROPULSION

[76] Inventor: Fabrizio Rigato, via XXVIII Aprile, 5-30027, San Donà di Piave (VE), Italy

[21] Appl. No.: 08/750,719

[22] PCT Filed: May 9, 1996

[86] PCT No.: PCT/IT96/00095

§ 371 Date: Dec. 17, 1996

§ 102(e) Date: Dec. 17, 1996

[87] PCT Pub. No.: WO96/35605

PCT Pub. Date: Nov. 14, 1996

[30] Foreign Application Priority Data

| May 10, 1995 | [IT] | Italy | PD95A0091 |
| Jul. 5, 1995 | [IT] | Italy | PD95A0140 |
| Mar. 22, 1996 | [IT] | Italy | PD96A0073 |

[51] Int. Cl.$^6$ ........................................... B62M 1/12
[52] U.S. Cl. ........................... 280/233; 280/250; 74/551.3
[58] Field of Search ............................... 74/551.3, 551.7; 280/230, 233, 234, 242.1, 244, 245, 246, 247, 248, 249, 250

[56] References Cited

U.S. PATENT DOCUMENTS

| 484,712 | 10/1892 | Hartley | 280/234 |
| 703,594 | 7/1902 | Kamper | 280/244 |
| 4,685,692 | 8/1987 | Fullilove et al. | 280/234 |
| 5,082,302 | 1/1992 | Nacar | 280/234 |
| 5,501,480 | 3/1996 | Ordelman et al. | 280/304.1 |

FOREIGN PATENT DOCUMENTS

| 1273373 | 8/1990 | Canada . |
| 0 285 115 | 10/1988 | European Pat. Off. . |
| 219564 | 6/1942 | Switzerland . |
| 2196586 | 5/1988 | United Kingdom ................... 280/234 |

*Primary Examiner*—Lanna Mai
*Assistant Examiner*—Avraham H. Lerner
*Attorney, Agent, or Firm*—Smith, Gambrell & Russell, LLP; Beveridge, DeGrandi, Weilacher & Young Intellectual Property Group

[57] ABSTRACT

An arm propulsion system for mounting on a bicycle includes a first crank and a second crank mounted on opposite ends of a connection and rotation pin. These cranks are mounted in a specular position with respect to one another. Hand-grips are connected with the cranks. The hand-grips lie on a common axis and are rotatable about the common axis, and this common axis is parallel to the axis of the connection and rotation pin. To apply propulsion force to the bicycle front tire, a first sprocket wheel, located coaxial with the connection and rotation pin, is connected with a second sprocket wheel by a first transmission mechanism (e.g., a chain). A third sprocket wheel, located coaxial with the second sprocket wheel, connects with the front wheel of the bicycle by a second transmission mechanism. A connection element is provided on the connection and rotation pin. This connection element includes a first toothed surface facing the first sprocket wheel, wherein when the first toothed surface engages a second toothed surface provided on the first sprocket wheel, the cranks are rotatable. Moreover, when another toothed surface on the connection element engages a fixed surface (optionally located on a box or housing for the connection element), the cranks are fixed.

13 Claims, 2 Drawing Sheets

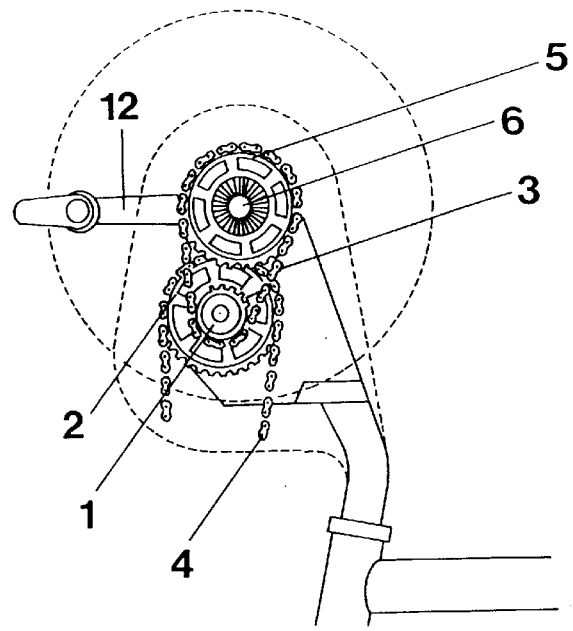
FIG. 2
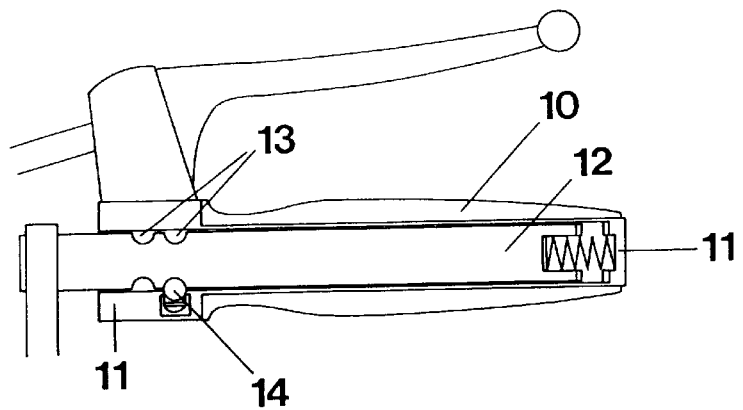
FIG. 3
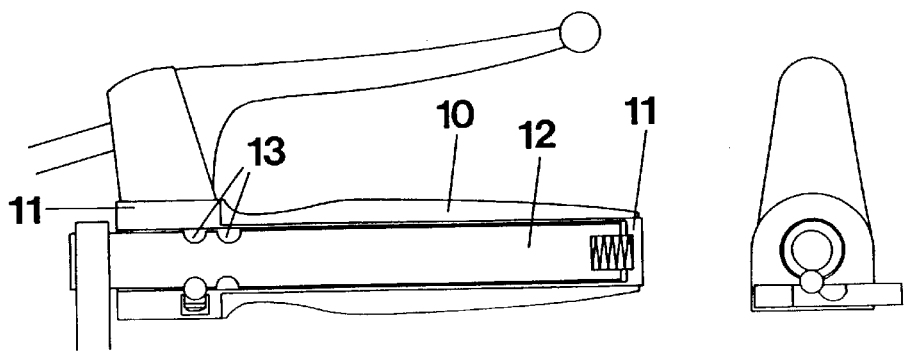
FIG. 4
FIG. 5
FIG. 6

ARM PROPULSION SYSTEM FOR BICYCLES AND THE LIKE, THAT MAY BE COMBINED WITH CONVENTIONAL FOOT PROPULSION

FIELD OF THE INVENTION

The present invention relates to an arm propulsion system for bicycles, that may be combined with conventional foot propulsion. The system includes two cranks fixed at the end of a connection and rotation pin in a specular position with respect to one another, wherein the free ends of the grasping cranks lie and rotate on one and the same axis, parallel to the axis connecting the cranks. The cranks, in turn, are connected, by means of a sprocket wheel and a chain or a small shaft or a belt or the like, to the front wheel of a bicycle.

BACKGROUND OF THE INVENTION

It is known that the greatest limitation in the use of conventional bicycles consists in that the conventional bicycle activates only the muscles of the legs, while the arms direct, stabilize, and brake the bicycle, without performing any pulling force.

For solving the above mentioned disadvantage, the prior art describes many systems for applying force to move bicycles, including systems that combine the action of the legs and the pelvis or even of the legs and the arms.

All of the known systems, however, are disadvantageous to use because they reduce the user's ability to balance the bicycle, and/or reduce the user's ability to maneuver the bicycle, and/or make use of very complicated, expensive, and heavy mechanisms.

In U.S. Pat. No. 632,797, granted on Sep. 12, 1899 to G. VAN HORN, a bicycle is described with a handle-bar having the form of cranks, which is used for applying a pulling force with the arms. This handle-bar crank system includes a connection with the back wheel of the bicycle. This rotating handle-bar rotates a toothed wheel, which in turn is connected, by means of a very long chain, to another sprocket wheel provided near the conventional sprocket wheel operated by the foot pedals.

The disadvantage of the bicycle described in this patent consists in that the extremely long, continuous chain—from the handle-bar to the pedal-hub, is twisted when the handle-bar is turned for directing the bicycle.

Many years later, this problem was faced in Canadian Patent No. 606,713 of Ernesto Nacar, who, starting from the bicycle of G. VAN HORN, tried to prevent the twisting of the chain that connects the rotating handle-bar to the pinion of the pedals that moves the rear wheel. The device described in this patent includes a considerable series of gears connected to transmission shafts and chains, which seemed to allow the adhesion of the chain even when the handle-bar was turned. The mechanism is very complex and presumably very heavy.

The application of a pulling force, with direct connection to the front wheel of the bicycle instead of to the back wheel, is shown in Italian Pat. Application No. 48237 A/86 in the name of Roberto MEZZINI. In this device, a fork made integral with the central tube that usually supports the handle-bar is directed with prongs upward and is provided, at the upper end, with a pedal keyboard placed in such a way as to be operated by the hands of the cyclist. The system is connected, by means of a chain, to the hub of the front wheel, which is provided with a pinion.

The bicycle is provided with counter-pedal brakes inserted in the hub.

This kind of bicycle makes use of a movement equal to the one produced by the legs by using the same kind of pedals near the handle-bar.

The evident disadvantage of this device is the lack of stability and the difficulty in directing the bicycle, as the arms are to be held in positions never specular to each other, as occurs with a conventional handle-bar. The same inventor tried to solve this problem on his own, as shown in Patenta Application No. RM 95 A 000 608 of Sep. 12, 1995, in which, together with the pedal-keyboard, a second, fixed handle-bar and a second saddle are provided, mounted near the fixed handle-bar, and onto which the cyclist rests his breast for finding better balance while driving the double-traction bicycle.

Further double-traction bicycles have been described, which make use of levers or lever systems, e.g., by Antonio GOMEZ ZARCO in Spanish Patent Application No. 523, 432 of Jun. 21, 1983, and by Horst EIFLER in German Patent No. DT 243677A1.

Thus, in the bicycle art, considerable effort has been made in creating an auxiliary traction mechanism in addition to that used for the back wheel, wherein the auxiliary traction mechanism makes use of the arms of the cyclist, which pull levers or rotate the handle-bar.

The results of these efforts have produced products having a considerable lack of stability and very complicated mechanisms.

SUMMARY AND DESCRIPTION OF THE INVENTION

The arm propulsion system according to the present invention, on the contrary, has proven to be totally stable, providing a bicycle that is easy to maneuver and safe.

The system described hereinbelow includes an assembly for applying force resulting in motion of the front wheel of any kind of cycle, which can be used in replacement of and/or in additional support of already existing structures, obtaining a completely independent traction system, operated by the muscle force of the arms, that may be used in combination with or in the alternative to conventional foot pedal force.

According to the present invention, the arm propulsion system that may be combined with conventional foot propulsion, without the inconveniences described with respect to the other systems with mixed propulsion, comprises a crank system placed near a conventional handle-bar. Because the pair of cranks are connected to the handle-bar support, the crank pair follows the handle-bar each time the direction of the bicycle is varied.

Thus, the cyclist uses the fixed handle-bar in a conventional manner only for changing direction or braking. In the alternative, if he grasps the cranks, he may use the front tration system by performing a synchronous circular and parallel movement with the arms and hands in a manner that is perfectly balanced, and at the same time, he may change the direction of the bicycle.

In fact, during the motion, the cyclist may easily control and direct the bicycle as the forces exerted by the arms and hands onto the cranks are always the same, and therefore do not cause oscillations or lateral forces on the front fork.

Furthermore, by laterally moving the still standing or rotating cranks as if they were the handle-bar, the front wheel, and thus the entire cycle, may be perfectly directed.

In a possible variant according to the present invention, the system eliminates the conventional, fixed handle-bar. In this case, the function of the fixed handle-bar is obtained by using a mechanism that allows the user to block the rotating movement of the cranks, which, once blocked but still connected to the handle-bar support, become a perfect handle-bar. Alternatively, if they are not blocked, they are free to rotate and therefore to transmit motion, even while continuing to direct the bicycle.

Once the cranks are blocked, an inconvenience may result if one wishes to move the front wheel (or the bicycle) in a reverse motion. The front wheel of the bicycle transmits the movement, by means of a chain, to the sprocket wheel integral with the pin connecting the cranks; if the latter are blocked, they prevent the reverse revolution of the front wheel, and the bicycle must be pulled backwards.

It is the aim of the system according to the present invention to solve all of the above mentioned inconveniences, and for this purpose, a preferred and perfectly working variant thereof provides:

- a particular system for blocking the cranks that allows, once operated, the primary sprocket wheel to remain free to rotate on its pin, and therefore does not transmit the movement of the front wheel to the cranks if the bicycle is to be moved in reverse motion;
- a chain transmission system with a reduction gear having a plurality of gears of different diameters, wherein the transmission system accomplishes three purposes:
  - a smaller front encumbrance,
  - a better look, and
  - greater safety in case of an accidental crash, as the system is contained in a protective housing of small dimensions, like a box;
- a system for blocking the hand-grips, independent from the crank block; and
- brake levers, assembled in a conventional manner, wherein the cables are always kept in predetermined positions for preventing the twisting thereof, without hindering the rotation of the cranks.

The system according to the present invention will be described in more detail hereinbelow and includes:

- two cranks mounted in a specular way at the ends of a rotation pin that connects the same;
- a fork support connected to the handle-bar connection, which supports the housing of the rotation pin of the cranks mounted on bearings, and two sprocket wheels, and the chain connecting them, which are part of the reduction gear system;
- a cylindrical, "connection" element, coaxial and integral with the rotation pin, which connects the cranks, wherein the element has, on both lateral surfaces, formations in the shape of a tooth or of a step or other structure, which are provided to be inserted on one side in identical, shaped surfaces provided on one side of the bigger sprocket wheel, and on the other side on identical shaped surfaces provided on an internal side of the fork support box;
- a coaxial sprocket wheel, mounted on the pin for rotating and connecting the two cranks in such a way as to be free for rotating, the sprocket wheel being connected by means of a toothed chain or gear to a smaller sprocket wheel, both enclosed in a container, called a "box";
- a third sprocket wheel that is fixed by means of a central pin and in a coaxial manner to the smaller sprocket wheel, which is in turn connected to the hub of the front wheel of the bicycle by means of a toothed chain or other transmission device, e.g., a belt or a small shaft etc.; and
- two hand-grips that allow the user to grasp the cranks, which may be free to rotate idle on their own axis, or which may be blocked against the cranks.

It should be noted that the whole pin may be moved by means of a selecting mechanism toward the bigger sprocket wheel or toward the wall opposite to the bigger sprocket wheel of the box. In the first case, the rotation pin will get stuck at the lateral wall of the crown, thereby allowing traction by means of the cranks. On the other hand, if the rotation pin approaches the opposite wall, it will get stuck with the wall of the box that is fixed, with the consequent blocking of the cranks.

In an equivalent, functional variant, the pin for rotating and connecting the cranks does not laterally move; only the cylindrical connection means moves. In that case, the cylindrical connection element, coaxial to the pin of the cranks, has a central, shaped hole that slides along the pin of the cranks, rotating together with the same.

When the connection element is moved laterally, by means of appropriate levers or the like, the connection element is linked to the bigger sprocket wheel, coaxial with the crank pin and therefore to the pin, or to the fixed part of the structure, thus hindering the rotation of the cranks' pin.

Once the cyclist has decided to use the front traction system, he will move the connection element toward the sprocket wheel that will get stuck with the connection element, and operate the hand-grips with a circular and parallel synchronous arm/hand movement, and in this manner, forward motion of the pin will be obtained that will move the toothed crown, which in turn will transmit motion to the front wheel of the bicycle.

The optimal combination of the reduction gear provides the use of a sprocket wheel coaxial to the cranks' pin, comprising thirty teeth, and connected, by means of a chain with an eight-pitch, with a nine-tooth sprocket wheel.

On axis and pin-connected to the nine-tooth sprocket wheel, a seventeen-tooth sprocket wheel is provided, and by a conventional chain is connected to the change gear of the front wheel of the bicycle. During motion, the cyclist may control and direct the bicycle because the force exerted by the cyclist onto the cranks is always equal, and therefore, it does not cause oscillations or lateral forces onto the front fork. Furthermore, by moving the still or moving cranks forward, the front wheel also is rotated, moving the bicycle in any desired direction. The crank-mechanism therefore works like a real handle-bar onto which the brake levers are mounted. When the cyclist wants to use only feet motion-traction, in particular in some cases as in urban traffic, he may wish that the cranks hold perfectly still, or that the cranks and also the hand-grips stay perfectly still in any angular position.

For this purpose, the selecting mechanism will move the connection element toward the rigid wall of the box, thus blocking the cranks, and it blocks the cranks by means of a system described hereinbelow.

The blocking system for the hand-grips provides for the coupling of two complementary surfaces, like teeth or steps or some other suitable surfaces, one on the end of each crank and the other on the bottom of the hand-grip's cylinder.

When the hand-grips approach the center of the bicycle, the surfaces are reciprocally engaged, hindering the relative rotation between the hand-grips and the cranks.

When the hand-grips are moved toward the external sides, the surfaces are also removed, allowing the hand-grips to freely rotate around the cranks. The shaped surfaces allow the hand-grips to be held in many angular positions around their own axis, so as to allow the cyclist a variety of choices for grasping the grips.

A selecting system operated with a push-button hinders the accidental, unintentional lateral movement of the hand-grips, assuring the free rotation or the blocking of the hand-grips.

When both blocks are used (crank blocks/hand-grip blocks), the cyclist will ride a completely conventional bicycle.

BRIEF DESCRIPTION OF THE DRAWINGS

The present invention will be described in more detail hereinbelow in conjunction with the enclosed drawings in which a preferred embodiment is shown.

FIG. 2 shows a lateral view of the upper-front part of the bicycle according to the invention;

FIGS. 3 and 4 show sectional views of the hand-grips 10 mounted onto appropriate cylinders 11;

FIG. 5 shows the hand-grips 10 including radial reliefs; and

FIG. 6 shows a sectional view of the hand-grip 10 with details of the selection mechanism 14.

DETAILED DESCRIPTION OF THE DRAWINGS

Figure 1:
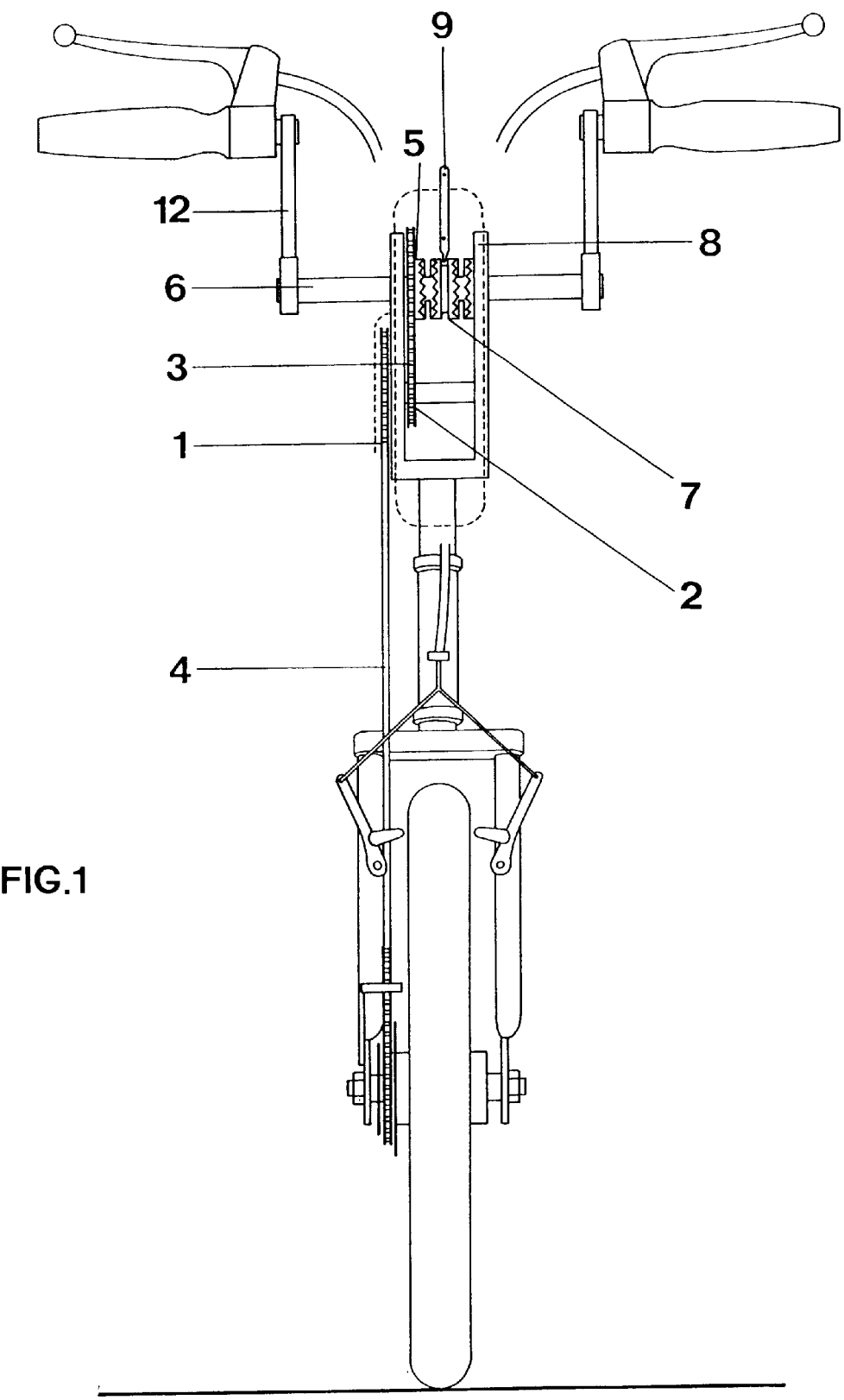
FIG. 1 shows a front view of a bicycle with the arm propulsion system according to the invention.

In the described embodiment, the case has been shown in which the sole pin of the cranks rotates, and the connection element moves along the axis of the cranks' pin.

The figures clearly show the two coaxial sprocket wheels 1 and 2, which are connected by means of two chains 3 and 4, the first to the primary sprocket wheel 5, rotating in idle gear around the rotation pin 6 of the cranks, and the second to the change gear group fixed to the front wheel of the bicycle.

In detail, FIG. 1 shows the connection element 7 rotating together with the pin 6 of the cranks and sliding on the pin 6. The connection element 7 has on its two sides the toothed surfaces that are alternatively engaged with two identical surfaces provided respectively on the side of the primary sprocket wheel 5, coaxial with the pin 6 of the cranks, or on a fixed part of the structure 8 supporting the cranks.

A suitable selecting system 9 allows the user to move the connection element 7 on pin 6 for engaging the connection element 7 with one toothed surface or the other toothed surface.

Moving the hand-grip 10 relative to the cylinder 11 so as to move the two toothed surfaces away from each other—as shown in FIG. 3—the hand-grip 10 may rotate around crank 12, while moving the hand-grip 10 in the opposite direction—as shown in FIG. 4—the two shaped surfaces of the cylinder 11 and of the crank 12 are engaged, hindering the hand-grips 10 from moving around the cranks 12.

The cranks 12 have two ring-shaped grooves 13, placed at a suitable distance, into which a selecting device 14 is inserted. The selecting device 14 has the function of keeping the cylinder 11 and the hand-grip 10 in the two furthermost positions for free movement or for blocking.

It is possible to provide a series of gears, as an equivalent solution, as an alternative to chain 3 and the relative sprocket wheels 1 and 2.

I claim:

1. An arm propulsion systen mounted to a bicycle, comprising:

a first crank;

a second crank;

a connection and rotation pin, rotatable about a first rotational axis, the pin having a first end and a second end, wherein the first crank is fixed to the first end of the pin and the second crank is fixed to the second end of the pin such that the first crank and the second crank are located in a specular position with respect to one another;

a first hand-grip connected with the first crank;

a second hand-grip connected with the second crank, wherein the first hand-grip and the second hand-grip lie on a common axis and are rotatable about the common axis, and wherein the common axis is parallel to the first rotational axis;

a first sprocket wheel coaxial with the connection and rotation pin;

a second sprocket wheel connected to the first sprocket wheel by a first transmission mechanism;

a third sprocket wheel coaxial with the second sprocket wheel, wherein the third sprocket wheel is engaged with a front wheel of the bicycle by a second transmission mechanism so as to apply a propulsion force to the front wheel; and a connection element provided on the connection and rotation pin, wherein the connection element includes a first toothed surface facing the first sprocket wheel, wherein when the first toothed surface engages a second toothed surface provided on the first sprocket wheel, the first and second cranks are rotatable.

2. An arm propulsion system according to claim 1, wherein the first transmission mechanism is a chain.

3. An arm propulsion system according to claim 1, wherein the second transmission mechanism is a chain.

4. An arm propulsion system according to claim 1, further including a rigid structure located adjacent the connection element, wherein the connection element includes a third toothed surface facing away from the first sprocket wheel and toward the rigid structure, wherein when the third toothed surface engages a fourth toothed surface provided on the rigid structure, the first and second cranks are held in a fixed position.

5. An arm propulsion system according to claim 4, wherein the first hand-grip is selectively: (a) rotatable about the common axis and with respect to a portion of the first crank, and (b) fixed with respect to the common axis and the first crank; and wherein the second hand-grip is selectively: (a) rotatable about the common axis and with respect to a portion of the second crank, and (b) fixed with respect to the common axis and the second crank.

6. An arm propulsion system according to claim 5, further including a first brake lever mounted adjacent the first hand-grip, and a second brake lever mounted adjacent the second hand grip.

7. An arm propulsion system according to claim 6, further including:

a first brake cable extending from the first brake lever, wherein a sheathing of the first brake cable is arranged so as not to hinder any movement of a cyclist; and a second brake cable extending from the second brake lever, wherein a sheathing of the second brake cable is arranged so as not to hinder any movement of a cyclist.

8. An arm propulsion system according to claim 4, wherein the rigid structure forms part of a box in which the connection element is housed.

9. An arm propulsion system according to claim 1, wherein the first hand-grip is selectively: (a) rotatable about the common axis and with respect to a portion of the first crank, and (b) fixed with respect to the common axis and the first crank; and wherein the second hand-grip is selectively: (a) rotatable about the common axis and with respect to a portion of the second crank, and (b) fixed with respect to the common axis and the second crank.

10. An arm propulsion system according to claim 9, further including a first brake lever mounted adjacent the first hand-grip, and a second brake lever mounted adjacent the second hand grip.

11. An arm propulsion system according to claim 10, further including:

a first brake cable extending from the first brake lever, wherein a sheathing of the first brake cable is arranged so as not to hinder any movement of a cyclist; and a second brake cable extending from the second brake lever, wherein a sheathing of the second brake cable is arranged so as not to hinder any movement of a cyclist.

12. An arm propulsion system according to claim 1, further including a first brake lever mounted adjacent the first hand-grip, and a second brake lever mounted adjacent the second hand grip.

13. An arm propulsion system according to claim 12, further including:

a first brake cable extending from the first brake lever, wherein a sheathing of the first brake cable is arranged so as not to hinder any movement of a cyclist; and a second brake cable extending from the second brake lever, wherein a sheathing of the second brake cable is arranged so as not to hinder any movement of a cyclist.

* * * * *